(12) United States Patent
Kwun et al.

(10) Patent No.: US 6,779,409 B1
(45) Date of Patent: Aug. 24, 2004

(54) MEASUREMENT OF TORSIONAL DYNAMICS OF ROTATING SHAFTS USING MAGNETOSTRICTIVE SENSORS

(75) Inventors: Hegeon Kwun, San Antonio, TX (US); Gary L. Burkhardt, Adkins, TX (US); Cecil M. Teller, Austin, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 09/355,177

(22) PCT Filed: Jan. 23, 1998

(86) PCT No.: PCT/US98/01297

§ 371 (c)(1),
(2), (4) Date: Jul. 27, 1999

(87) PCT Pub. No.: WO98/34455

PCT Pub. Date: Aug. 13, 1998

Related U.S. Application Data
(60) Provisional application No. 60/036,039, filed on Jan. 27, 1997.

(51) Int. Cl.[7] .................................................. G01L 3/02
(52) U.S. Cl. .................................................. 73/862.333
(58) Field of Search ........................ 73/862.333, 862.36, 73/862.331, 862.335, 58.7, 862.69

(56) References Cited

U.S. PATENT DOCUMENTS

| | | | |
|---|---|---|---|
| 3,046,781 A | | 7/1962 | Pratt ............................ 73/136 |
| 4,716,773 A | * | 1/1988 | Nonomura et al. .......... 324/209 |
| 4,803,885 A | | 2/1989 | Nonomura et al. ....... 73/862.36 |
| 4,811,609 A | * | 3/1989 | Nishibe et al. ........... 73/862.36 |
| 4,891,992 A | * | 1/1990 | Kobayashi et al. ..... 73/862.335 |
| 4,907,462 A | * | 3/1990 | Obama et al. ............ 73/862.36 |
| 4,939,937 A | | 7/1990 | Klauber et al. .......... 73/862.36 |
| 4,979,399 A | | 12/1990 | Klauber et al. .......... 73/862.36 |
| 5,062,306 A | * | 11/1991 | Gotoh et al. ............ 73/862.331 |
| 5,321,985 A | * | 6/1994 | Kashiwagi et al. ..... 73/862.335 |
| 5,449,418 A | | 9/1995 | Takagi et al. ................. 148/304 |
| 5,456,113 A | * | 10/1995 | Kwun et al. ................... 73/587 |
| 5,546,817 A | * | 8/1996 | Heiman ................. 73/862.333 |
| 5,811,695 A | * | 9/1998 | Satoh et al. ............ 73/862.331 |

FOREIGN PATENT DOCUMENTS

JP          3269-228         11/1991

* cited by examiner

Primary Examiner—Edward Lefkowitz
Assistant Examiner—Jewel V. Thompson
(74) Attorney, Agent, or Firm—Kammer Browning PLLC (57) ABSTRACT

A device and method for the non-contact measurement of dynamic torsion in a rotating shaft using magnetostrictive sensors (MsS). The monitoring and detection system has specially configured magnetostrictive signal detectors that include inductive pick-up coils, in which signals corresponding to localized shaft torques are induced. The basic system sensor utilizes either a permanent DC bias magnet positioned adjacent the rotating shaft or applies a residual magnetic field to the shaft. The techniques described in conjunction with the system are particularly advantageous for on-line monitoring of loaded rotating shafts that are integral parts of power trains, by providing a low-cost and a long-term sensor for acquiring dynamic data of the shaft portion of the machinery system being monitored and/or controlled.

9 Claims, 7 Drawing Sheets

Fig. 6b ration Ser. No. 60/036,039 filed Jan. 27, 1997.

MEASUREMENT OF TORSIONAL DYNAMICS OF ROTATING SHAFTS USING MAGNETOSTRICTIVE SENSORS

This application claims the benefit of Provisional application Ser. No. 60/036,039 filed Jan. 27, 1997.

BACKGROUND OF THE INVENTION

I. Field of the Invention

The present invention relates generally to methods and devices for the noncontact monitoring and measurement of the torsional dynamics of rotating shafts. The present invention relates more specifically to methods and devices for the noncontact monitoring and measurement of stationary and transient torques in rotating shafts using magnetostrictive sensors (MsS).

II. Description of the Prior Art

It is common in many different machine systems, for mechanical power from an electrical motor, combustion engine, or gas turbine to be transmitted to a load through a power train of some type. Rotating shafts are frequently integral parts of such power trains. A variety of machinery dynamics, including vibration, lateral movement, and torsional motion, have a direct effect on the operational conditions of these machine systems. The monitoring of these machinery dynamics offers, therefore, a valuable means of diagnosing and correcting machinery problems in a manner that can assist in the effective operation and maintenance of the machinery.

For example, the measurement of the torsional dynamics of a rotating shaft can be used to control backlash at gear teeth and other types of drive train couplings, for a more efficient operation of the machinery and less wear on the machinery components.

At present, various methods are used to measure the torsional dynamics of a rotating shaft. These methods include shaft encoders, torsional accelerometers, and strain gauges. In general, the currently available methods require physical contact of some type with the rotating shaft (side or end surfaces) and a means of electrical/electronic communication such as slip rings or telemetry for relaying sensor information to signal analysis equipment. In many situations, these methods are not only difficult to use but costly to implement. In addition, the available methods generally lack long-term durability, which is essential for on-line monitoring and control during the service life of high speed rotational machinery.

Some efforts in the past have attempted to implement a non-contact means for the measurement of dynamic torsion in rotating shafts using magnetostrictive techniques. None of these efforts, however, disclose or anticipate a detector that does not include some form of periodic external excitation of the magnetostrictive material. The following patents are considered illustrative of the art encountered within the field.

U.S. Pat. No. 4,979,399, issued to Klauber et al. on Dec. 25, 1990, entitled "Signal Dividing Magnetostrictive Torque Sensor", describes a non-contacting method for sensing torque utilizing the magnetostrictive principle by inducing a primary magnetic flux in a rotating shaft with an excitation coil.

U.S. Pat. No. 4,939,937, issued to Klauber et al. on Jul. 10, 1990, entitled "Magnetostrictive Torque Sensor", likewise describes a system for sensing torque based on the magnetostrictive principle that utilizes a primary excitation coil to introduce a magnetic flux in the rotating shaft. The system involves appropriate placement both of a sensor coil and the primary excitation coil in positions adjacent to the rotating shaft and appropriate orientation of the coils with respect to each other.

U.S. Pat. No. 4,811,609, issued to Nishibe et al. on Mar. 14, 1989, entitled "Torque Detecting Apparatus", describes a system for measuring the transmitted torque within a rotating magnetic material by means of a magnetostrictive sensor. Essential to the Nishibe system is the use of a demagnetization coil designed to restore the rotary magnetic material to a state of zero magnetization. Included in this system are driving circuits and excitation coils for establishing the magnetic field within the rotating shaft.

U.S. Pat. No. 4,803,885, issued to Nonomura et al. on Feb. 14, 1989, entitled "Torque Measuring Apparatus", also describes a non-contact method for measuring torque in a rotating shaft of ferromagnetic material using magnetic based sensors. The device includes an excitation coil wound around the outer periphery of the rotating shaft and adapted to magnetize the shaft in an axial direction. A detecting core ring in the form of an integral unit includes a number of detecting cores arranged around the circumferential area of the rotating shaft.

U.S. Pat. No. 3,046,781, issued to Pratt on Jul. 31, 1962, entitled "Magnetostrictive Torque Meter", provides an early teaching of the basic approach of employing magnetostrictive principles to implement a torque meter for a rotating shaft based on stress measurements of the shaft material. The description of the operation of the non-contacting embodiment (shown in FIG. 1 of the Pratt patent) refers to the use of an AC excitation coil wound around the shaft, and the inclusion of a "magnetostriction constant".

Japanese Patent No. 3-269228, issued to Aisin Seiki on Nov. 29, 1991, entitled "Magnetostriction Detector for Torque Detector Using Film of Magnetostrictive Metal Containing Super Magnetostrictive Alloy Particles", describes a system for measuring torque in a rotating shaft utilizing a primary excitation coil and a secondary detection coil adjacent to a surface on the shaft that has been covered with a ferromagnetic material. The focus of this patent involves the type of metallic material utilized as the magnetostrictive substance.

Each of the above patents describe devices for measuring torque in a shaft using a similar approach that requires a means for applying an AC magnetic field to the ferromagnetic shaft material. Most of the later issued U.S. patents provide teachings of similar magnetostrictive torque measuring approaches. Some of these patents suggest using a thin coating of magnetostrictive materials around nonferromagnetic materials as is well known in the field of magnetostrictive sensing.

III. Background on the Magnetostrictive Effect

The magnetostrictive effect is a property peculiar to ferromagnetic materials. The magnetostrictive effect refers to the phenomena of physical, dimensional change associated with variations in magnetization. The effect is widely used to make vibrating elements for such things as sonar transducers, hydrophones, and magnetostrictive delay lines for electric signals. The magnetostrictive effect actually describes physical/magnetic interactions that can occur in two directions. The Villari effect occurs when stress waves or mechanical waves within a ferromagnetic material cause abrupt, local dimensional changes in the material which, when they occur within an established magnetic field, can generate a magnetic flux change detectible by a receiving coil in the vicinity. The Joule effect, being the reverse of the Villari effect, occurs when a changing magnetic flux induces a mechanical vibrational motion in a ferromagnetic material through the generation of a mechanical wave or stress wave. Typically, the Joule effect is achieved by passing a current of varying magnitude through a coil placed within a static magnetic field thereby modifying the magnetic field and imparting mechanical waves into a ferromagnetic material present in that field. These mechanical or stress waves then propagate not only through the portion of the ferromagnetic material adjacent to the generating coil but also into and through any further materials in mechanical contact with the ferromagnetic material. In this way, non-ferromagnetic materials can serve as conduits for the mechanical waves or stress waves that can thereafter be measured by directing them through these ferromagnetic "wave guides" placed proximate to the magnetostrictive sensor element.

The advantages of magnetostrictive sensors over other types of vibrational sensors becomes quite clear when the structure of such sensors is described. All of the components typically utilized in magnetostrictive sensors are temperature, pressure, and environment-resistant in ways that many other types of sensors, such as piezoelectric based sensors, are not. High temperature, permanent magnets, magnetic coils, and ferromagnetic materials are quite easy to produce in a variety of configurations. Further, although evidence from the previous applications of magnetostrictive sensors would indicate the contrary, magnetostrictive sensors are capable of detecting mechanical waves and translating them into signals that are subject to very fine analysis and discrimination in a manner that allows information to be obtained about the elements in an object (such as a rotating steel shaft) that may have initially generated the stress.

It would be desirable, therefore, to have a torque measurement system that utilizes magnetostrictive sensors in conjunction with a rotating shaft. It would be desirable to maintain the advantages of such a system through its non-contact method of detecting the magnetostrictive effect within ferromagnetic material contained on or in the rotating shaft. In addition, it would be preferable to simplify such a system by eliminating the need for at least the primary excitation coil found in each of the existing systems based on magnetostrictive sensors. It would be desirable to implement such a system with a magnetostrictive sensor that provides a signal which, when amplified and appropriately filtered, carries the same information about the torque being experienced in the rotating shaft as more expensive, cumbersome, and delicate systems that use strain transducers, telemetry devices and the like.

SUMMARY OF THE INVENTION

The present invention involves methods and devices for the non-contact measurement of dynamic torsion in a rotating shaft using magnetostrictive sensors (MsS). The present invention utilizes a specially configured signal detector, that includes an inductive pickup coil, in which signals corresponding to localized shaft torques are induced. The techniques of the present invention are particularly advantageous for the active monitoring of loaded rotating shafts that are integral parts of power trains, by providing a low-cost and long-term sensor for acquiring dynamic data of the shaft portion of the machinery system being monitored and/or controlled.

As disclosed in the basic illustrative embodiment, an inductive pickup coil is positioned to encircle the rotating shaft whose torsion dynamics are to be measured. Dynamic stresses associated with torsional vibrations of the shaft cause changes in the magnetic induction of the magnetostrictive material of which the shaft is made (or plated with), which in turn induce signal voltages in the pickup coil. A permanent biasing magnet positioned outboard of the pickup coil maintains the magnetostrictive material magnetized, by biasing it, or in the alternative, leaving a residual magnetization in the shaft area adjacent the signal detector. Keeping the magnetostrictive material magnetized increases the stress sensitivity of the detector and makes its frequency response linear with stress. In use, the detected signals are conditioned using standard electronic signal conditioning circuitry for subsequent processing in a data processor to develop the desired dynamic torsional data.

BRIEF DESCRIPTION OF THE DRAWINGS

FIG. 5b is a graphic plot of torque as measured with strain gauges on the same system described with FIG. 5a.

FIG. 6b is a graphic plot of an amplified and filtered magnetostrictive sensor output signal for the system described with FIG. 6a.

DETAILED DESCRIPTION OF A PREFERRED EMBODIMENT

Figure 1:
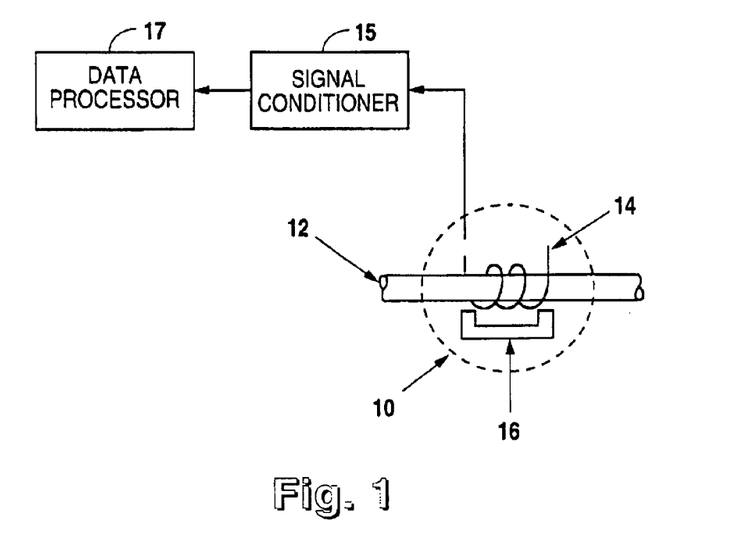
FIG. 1 is a schematic diagram showing the basic configuration of the magnetostrictive sensor system of the present invention for monitoring dynamic torque in a rotating shaft.

In the present invention, measurements of the torsional dynamics of a rotating shaft are accomplished without making physical contact with the shaft through the use of a magnetostrictive sensor (MsS). FIG. 1 illustrates the basic configuration of a MsS together with the accompanying electronics for signal conditioning. Since the MsS relies on a physical phenomenon known as the Villari effect (which refers to magnetic induction changes resulting from mechanical stress) peculiar to the ferromagnetic materials, the invented method is applicable to shafts made of ferromagnetic materials. If the shaft is not made of ferromagnetic materials, the invented method is still applicable by plating the shaft with a suitable ferromagnetic material such as nickel. In this case, the plating is necessary only in the local area on which the MsS is placed.

Signal detector (14) in FIG. 1 is a magnetic field sensing device, typically an inductive pickup coil, which either encircles or is placed adjacent the magnetostrictive material.

Dynamic stresses associated with torsional vibrations of shaft (12) cause the magnetic induction of the magnetostrictive material to change with time (by the Villari effect) which, in turn, induces an electric voltage in coil (14). In the area where detector (14) is placed, the magnetostrictive material is kept magnetized by using permanent biasing magnet (16) or by leaving a residual magnetization in the material. The latter case, which is accomplished by magnetizing the material using a permanent magnet and then removing the magnet, is preferred because the need for installing bias magnet (16) is eliminated.

The reasons for keeping the material magnetized are twofold: (a) to enhance the stress sensitivity of the detector and (b) to make the frequency response of the detector linear. If the material were not magnetized, the frequency of the detected signal would be twice the frequency of the stress. The detected signals are conditioned (15), as is known in the art, using standard electronics (for example, an amplifier and a filter). The signals are then processed (17) to identify levels and changes in the torsional forces in the rotating shaft and, in conjunction with other information about the operational status of the machinery, to diagnose or control the machinery in response to the measured forces.

Figure 2:
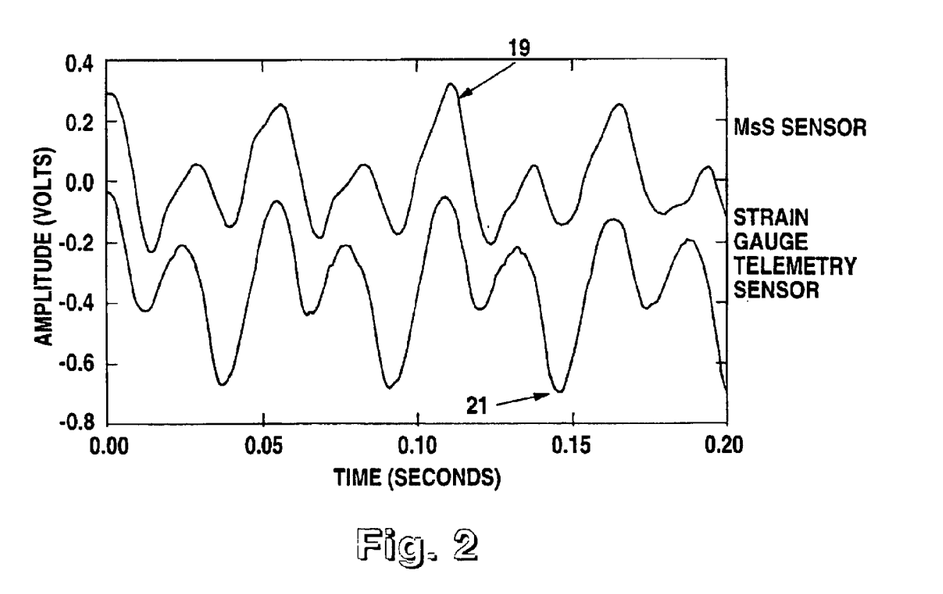
FIG. 2 is a graphic comparison between torsional vibration signals detected from a rotating shaft using a magnetostrictive sensor and a prior art strain gauge/telemetry sensor.

FIG. 2 shows an example of a torsional vibration signal (19) detected from a rotating steel shaft using the MsS system of the present invention. For comparison, a signal (21) detected simultaneously using an independent strain gauge/telemetry device is also given. For clarity, the two signals (19) and (21) in these plots are displaced vertically from each other. The shaft in this case was a 2.5 cm diameter, AISI 1018 carbon steel shaft, which was installed between a four-cylinder automotive engine and a dynamometer. An encircling coil with a 4.0 cm inside diameter (which gives a 0.75 cm gap between the coil and shaft surface) was used as the signal detector. Residual magnetization was used as the DC biasing magnetic induction required for magnetostrictive sensing. The EMF voltage induced in the coil was amplified (by approximately 20 dB) and low-pass filtered (at around 50 Hz). The engine speed at the time of data acquisition was approximately 1100 rpm.

As shown in FIG. 2, the torsional vibrational signal (19) detected by the MsS is very similar to the signal (21) detected by the strain gauge/telemetry device, confirming the principle of the invented method and device. Since the MsS requires no physical contact and is simple and durable, the invented method offers an economic means of on-line, long-term monitoring of the torsional dynamics of rotating shafts for machinery diagnosis and control.

Figure 3:
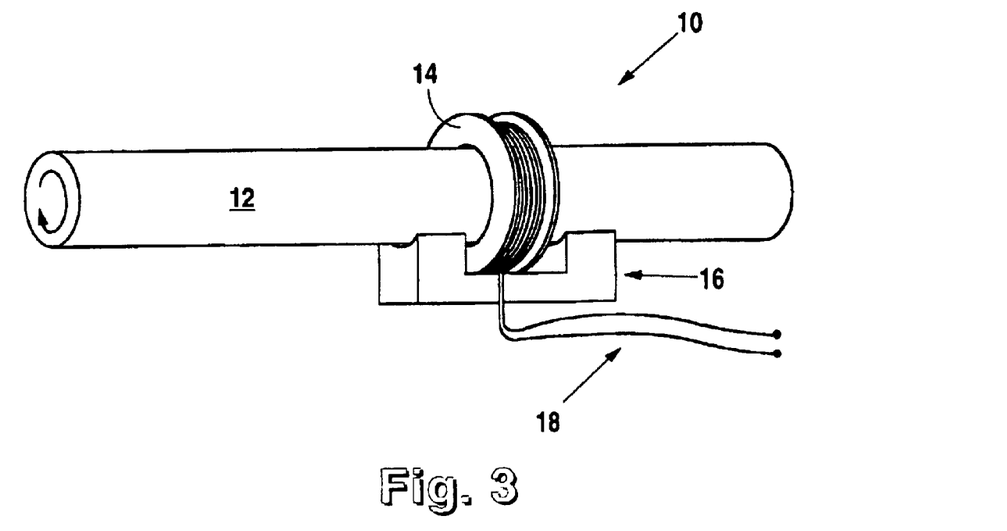
FIG. 3 is a perspective diagram showing the basic configuration of the magnetostrictive sensor of the present invention as it might be placed about a rotating shaft.

FIG. 3 describes in greater detail the structure of a first example of the use of a magnetostrictive sensor of the present invention in conjunction with a rotating shaft. In FIG. 3 rotating shaft (12) is itself constructed of ferromagnetic material and therefore requires no implementation of a ferromagnetic surface thereon. Magnetostrictive sensor (10) comprises detection coil (14) and permanent magnet (16). Coil (14) terminates in leads (18) which are connected to the electronics of the system of the present invention as described above in FIG. 1.

As a further example of a setup appropriate for implementation of the present invention and which generated the signals disclosed and described below, a 2.5 cm diameter, 56 cm long, 4340 alloy steel shaft, is installed between a four cylinder internal combustion engine (Nissan Twin Cam, 16 valve) and a dynamometer. Coil (14), consisting of 25 turns of AWG 20 wire with a 4 cm inside diameter and a 1.2 cm width, is placed around shaft (12) as indicated.

The establishment of a baseline magnetic field within rotating shaft (12) can be accomplished by way of placement of permanent magnet (16) in proximity to but spaced from rotating shaft (12) in the manner shown in FIG. 3. In this way a DC biased magnetic field is established within rotating shaft (12) that provides the advantages described above for the detection coil in measuring changes in the magnetic flux brought about by the magnetostrictive effect. Alternatively, the area on the shaft around which coil (14) is placed may be magnetized with a residual field by applying and removing a permanent magnet. This residual magnetization is sufficient for the DC biasing magnetic induction required for magnetostrictive sensing.

In operation the voltage induced in the detection coil is amplified (see FIG. 1) by approximately 20 dB using a preamp such as that found in an EG & G PARC Model 124A lock-in amplifier.

Figure 4:
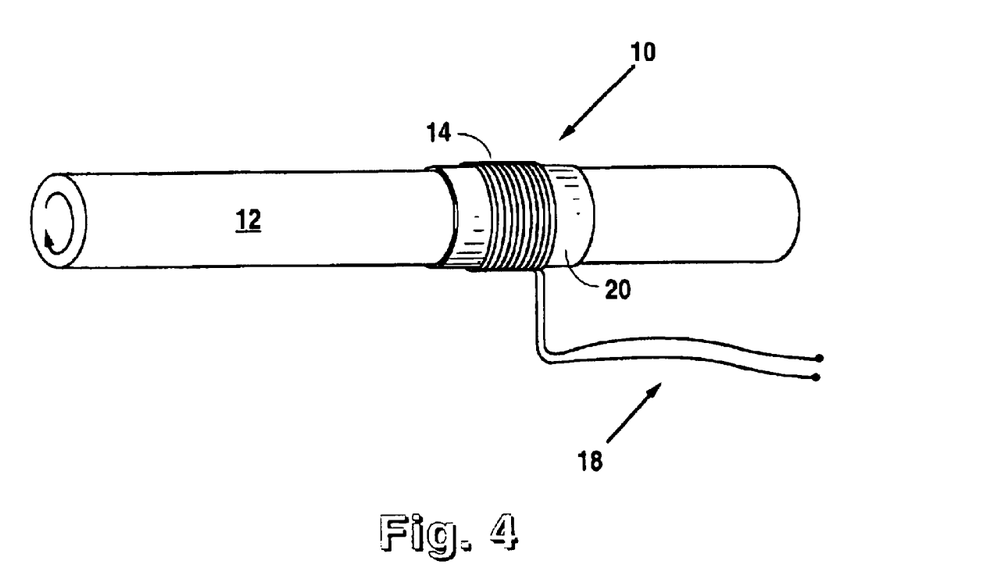
FIG. 4 is a perspective diagram showing alternative embodiment of the magnetostrictive sensor of the present invention in a simplified configuration positioned about an area of ferromagnetic material placed on a non-ferromagnetic rotating shaft.

FIG. 4 discloses an alternative approach of utilizing the sensor of the present invention that simplifies the apparatus even further. In its most basic embodiment the system of the present invention incorporates coil (14) positioned about rotating shaft (12) with few other supporting components. If rotating shaft (12) is constructed of a ferromagnetic material, then no further structures are required. If rotating shaft (12) is not made of a material with sufficient ferromagnetic characteristics, then ferromagnetic material (20) must be adhered to and positioned in conjunction with rotating shaft (12) at the point at which sensor (10) is placed. The placement of various ferromagnetic materials onto nonferromagnetic rotating shafts is well-known in the art.

For comparison in the described test system, a conventional strain gauge/telemetry torque sensor was installed on the rotating shaft to provide an independent measure of the torque. This comparison sensor for the system generating the data in FIGS. 5a–5c and 6a–6b consisted of two-axis strain gauges and radio telemetry devices. The strain gauges were bonded to the shaft surface and configured to produce an output in proportion to the torque. The transmitter for the strain gauge output and a battery for the transmitter were also clamped onto the shaft. A stationary receiving antenna was installed adjacent to the transmitter. The signal from the antenna was amplified, demodulated, and filtered to produce the torque signal. (This test setup demonstrates the complexity with which accurate torque readings have heretofore been made.) Signals from both the magnetostrictive sensors and the strain gauge/telemetry torque sensors were simultaneously detected and analyzed on an appropriate digitizing oscilloscope.

Figure 5A:
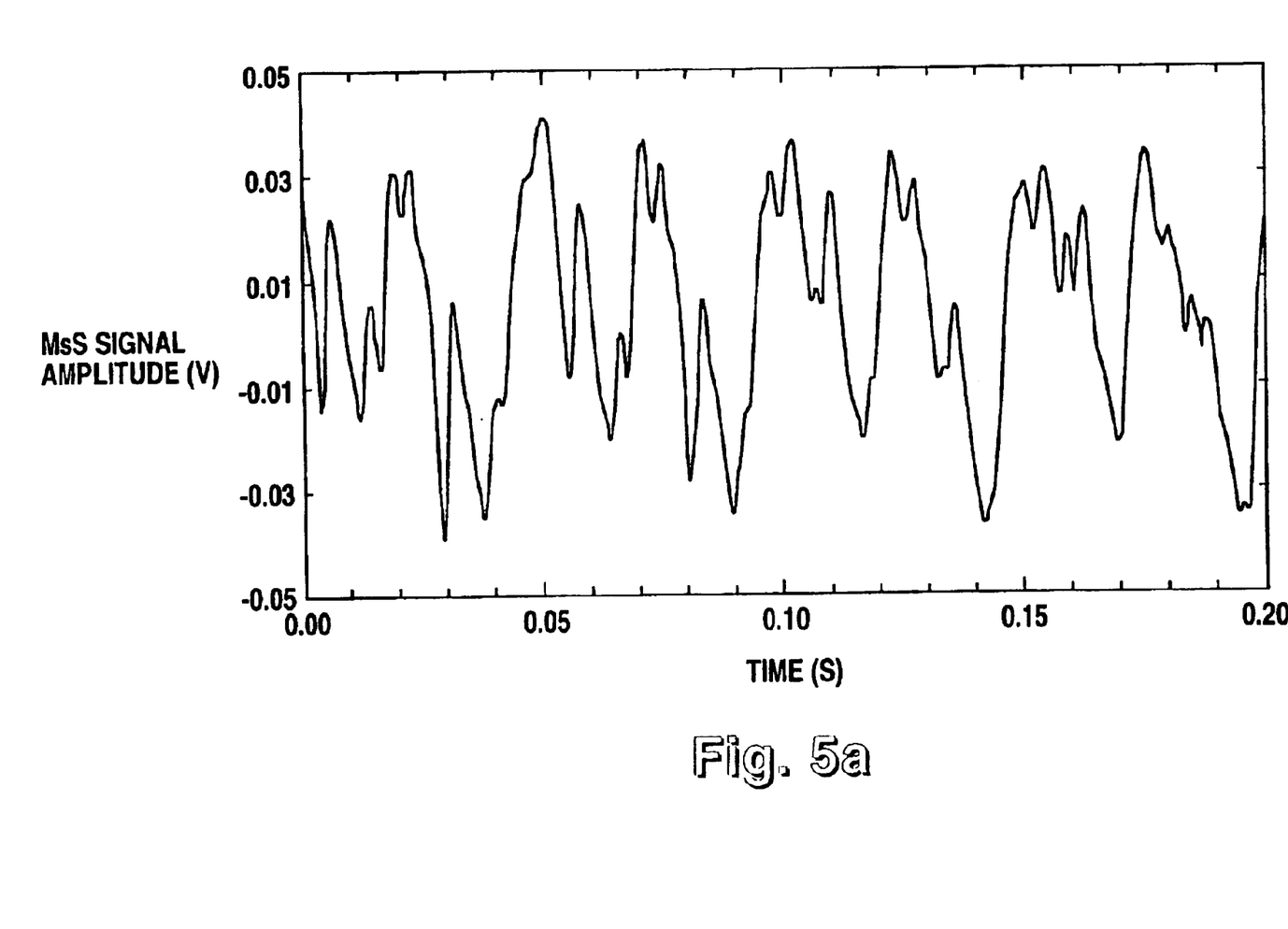
FIG. 5a is a graphic plot of a magnetostrictive sensor output signal for a rotating shaft driven by an internal combustion engine.
Figure 5B:
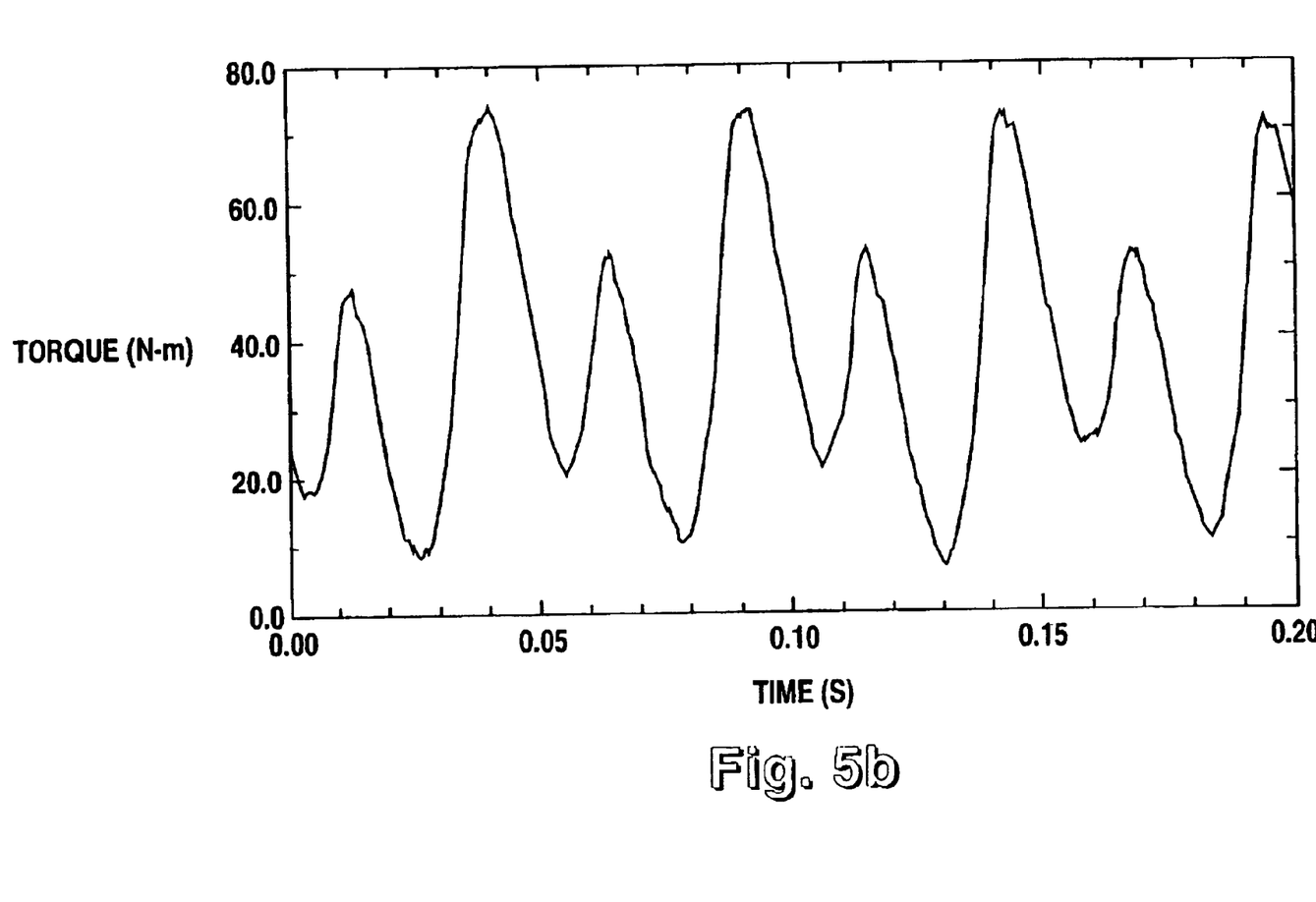
Figure 5C:
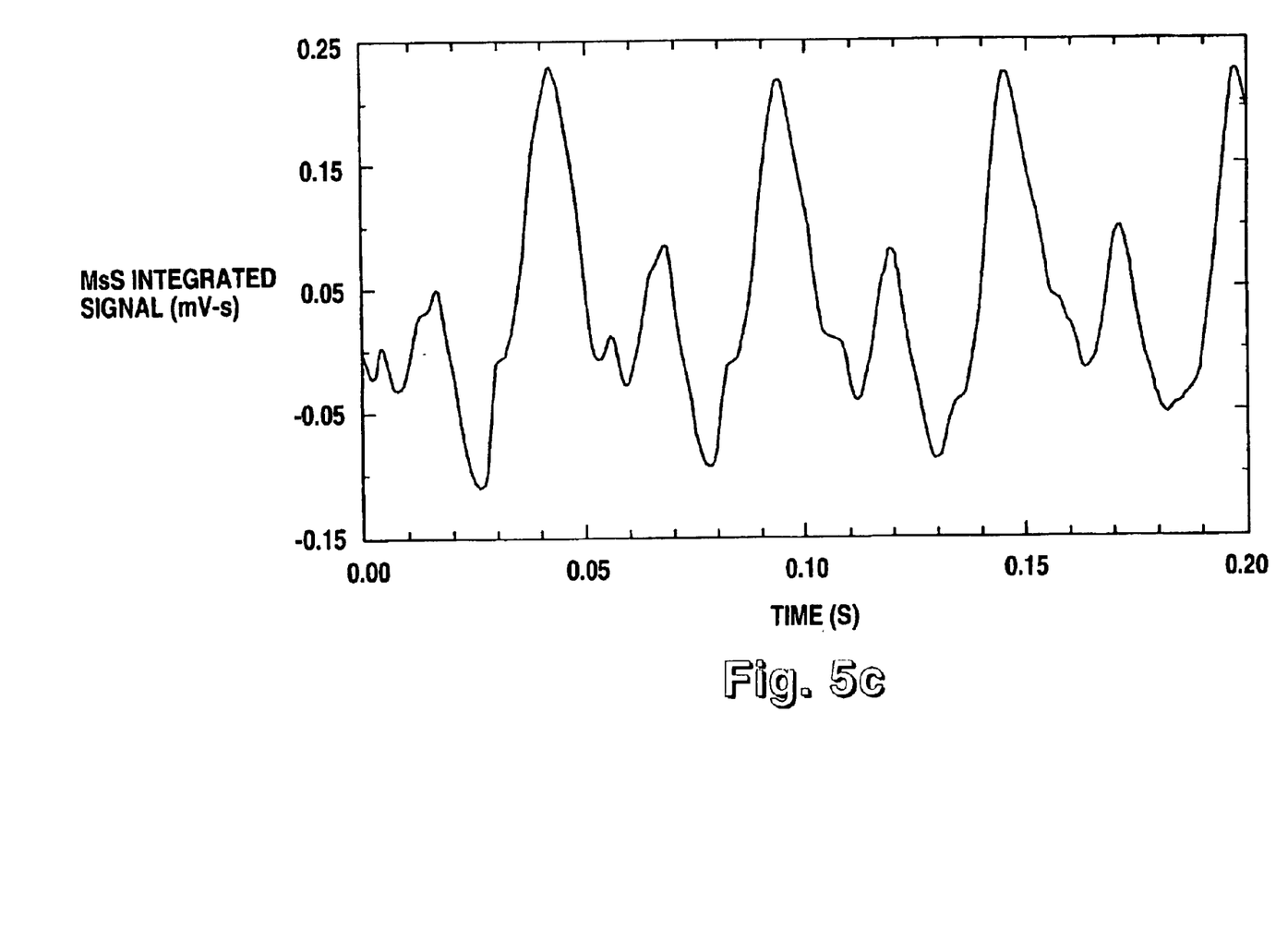
FIG. 5c is a graphic plot of the magnetostrictive sensor signal shown in FIG. 5a, integrated over time.

FIG. 5a shows the fundamental magnetostrictive sensor signal created with an engine speed of approximately 1160 RPM and a steady state torque of 38 N-m. FIG. 5b represents the same time period in the operation of the system as measured by the strain gauge/telemetry torque sensors. It is noted that the signals displayed in FIGS. 5a and 5b are distinct because the magnetostrictive sensor output is proportional to the rate of torque change with time. This derives from the fact that the signal was obtained from the voltage induced in the sensing coil by the changing magnetic field. In order to obtain a signal that varies with the actual torque (or magnetic field) changes, the magnetostrictive signal must be integrated over time. Integration may be accomplished by subtracting the DC component (caused by amplified offset) from the signal and then integrating the signal numerically. The result of this process is shown in FIG. 5c which agrees with the strain gauge data shown in FIG. 5b.

Figure 6A:
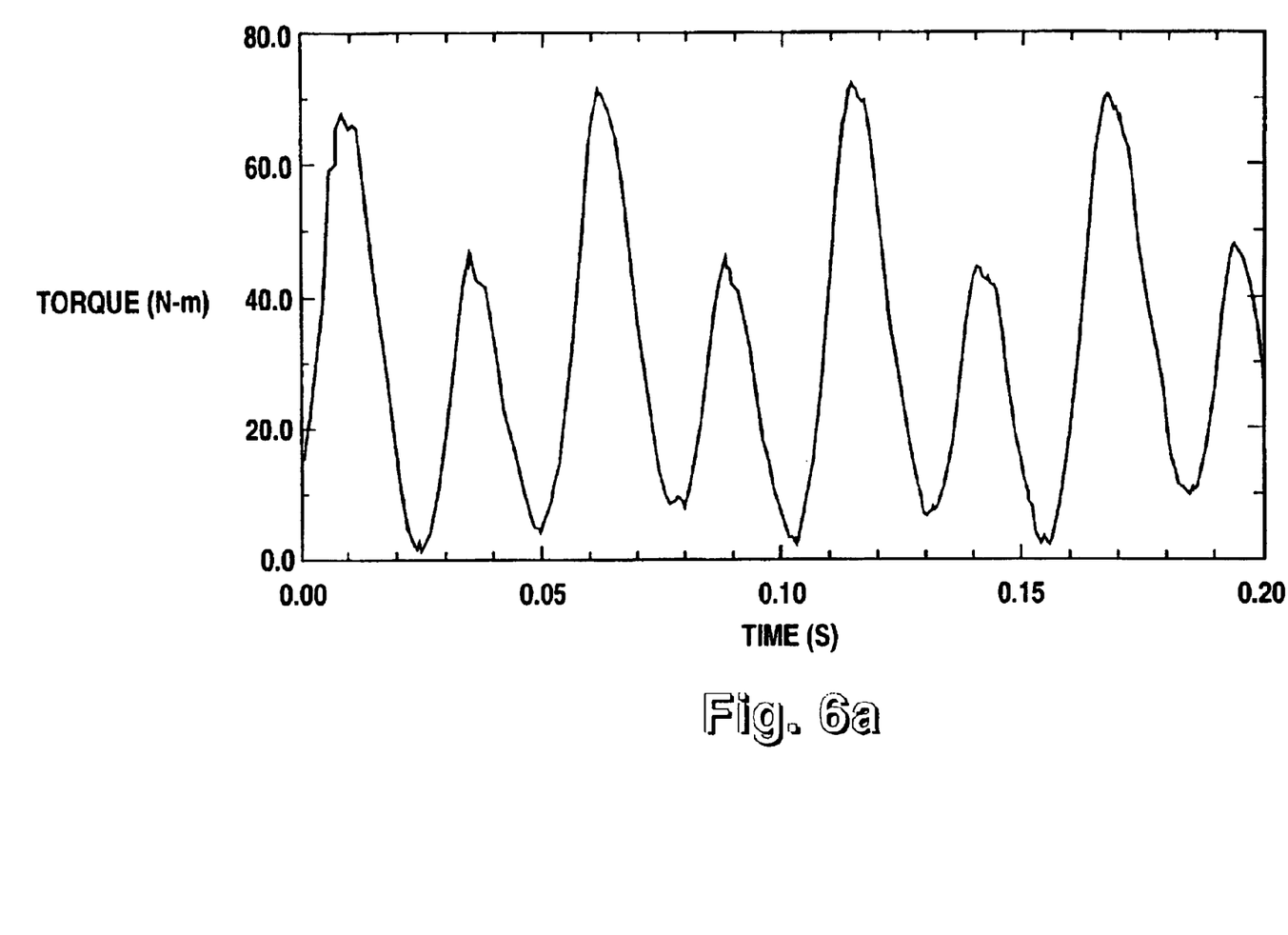
FIG. 6a is a graphic plot of torque as measured by strain gauges for a second example utilizing an internal combustion engine.
Figure 6B:
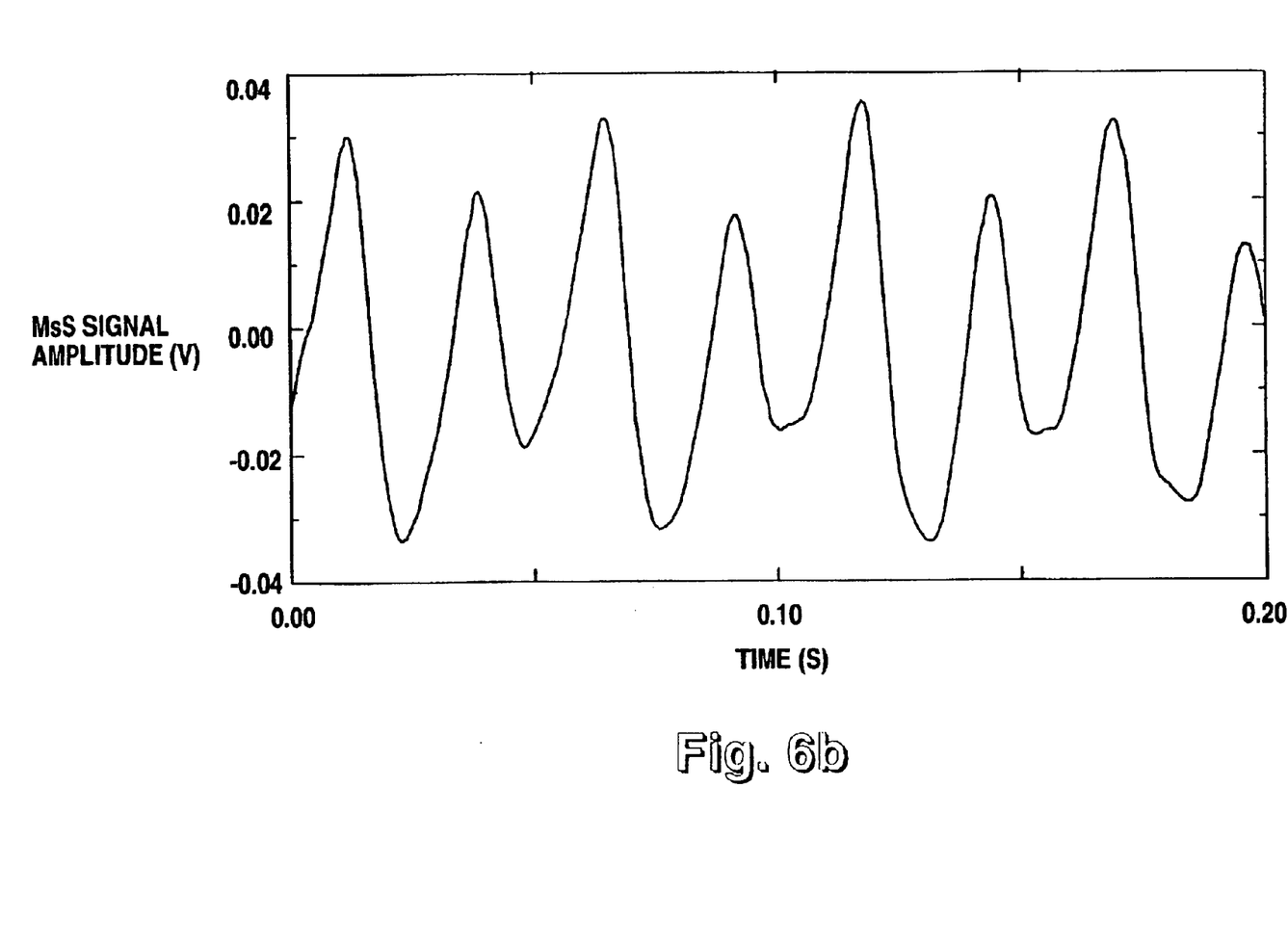

An effect similar to the integration of the cyclic magnetostrictive sensor signal can be achieved electronically using a low pass filter. An example of data taken using a low pass filter is shown in FIG. 6b. The strain gauge data taken simultaneously as the data shown in FIG. 6b is shown in FIG. 6a for comparison. Here the engine speed was 1130 RPM and the steady state torque was 32 N-m.

The results of the implementation of the present invention show that the appropriate use and positioning of a permanent DC bias magnet and/or the placement of a residual DC magnetic field within a rotating shaft, is sufficient to establish the baseline magnetic field appropriate for the use of magnetostrictive sensors. The present invention eliminates the need for a primary excitation coil as is most often found in the prior art. The simplified detection coil utilized by the present invention adequately derives a signal capable of analysis for the determination of real time torque measurements for the rotating shaft.

It is anticipated that various embodiments of the present invention could be used in conjunction with a variety of machinery devices that incorporate rotating shafts. These rotating shafts can be either ferromagnetic or non-ferromagnetic and still be monitored by the system of the present invention. It is anticipated that a variety of other sensor configurations incorporating the basic permanent magnet/detection coil structure could be utilized, which fall under the scope of the present invention.

We claim:

1. A device for measuring transient torque in a rotating shaft, said rotating shaft comprising ferromagnetic material wherein said transient torque generates a magnetic flux change, said device comprising:
   (a) a magnetostrictive sensor positioned in spaced proximity to said rotating shaft, said sensor comprising:
      (1) a detection coil surrounding said rotating shaft and having therein an induced voltage signal indicative of a magnetic flux change;
      (2) a permanent DC bias magnet, said magnet establishing a baseline static magnetic field within said ferromagnetic material;
   (b) a signal conditioner for receiving, amplifying and filtering said induced voltage signal from said magnetostrictive sensor thereby conditioning said induced voltage signal; and
   (c) a signal analyzer for receiving and analyzing said conditioned induced voltage signal and determining therefrom a quantitative value for said transient torque.

2. The device of claim 1 wherein said rotating shaft consists essentially of a ferromagnetic material.

3. The device of claim 1 wherein said rotating shaft comprises a non-ferromagnetic material and a ferromagnetic material, said ferromagnetic material adjacent said magnetostrictive sensor and in mechanical contact with said non-ferromagnetic material.

4. A device for measuring transient torque in a rotating shaft, said rotating shaft comprising ferromagnetic material wherein said transient torque generates a magnetic flux change, said ferromagnetic material being residually magnetized so as to establish a baseline magnetic field within said ferromagnetic material, said device comprising:
   (a) a magnetostrictive sensor positioned in spaced proximity to said rotating shaft, said sensor comprising a detection coil surrounding said rotating shaft and having therein an induced voltage signal indicative of said magnetic flux change;
   (b) a signal conditioner for receiving, amplifying and filtering said induced voltage signal from said magnetostrictive sensor thereby conditioning said induced voltage signal; and
   (c) a signal analyzer for receiving and analyzing said conditional induced voltage signal and determining there from a quantitative value for said transient torque.

5. The device of claim 4 wherein said rotating shaft consists essentially of a ferromagnetic material.

6. The device of claim 4 wherein said rotating shaft comprises a non-ferromagnetic material and said rotating shaft adjacent said magnetostrictive sensor comprises ferromagnetic material in mechanical contact with a balance of said rotating shaft.

7. A method for measuring transient torque in a rotating shaft, said rotating shaft comprising ferromagnetic material wherein said transient torque generates a magnetic flux change, said method comprising the steps of:
   (a) establishing a baseline magnetic field within said ferromagnetic material;
   (b) positioning a detection coil in spaced proximity to said rotating shaft said detection coil having an induced voltage signal indicative of said magnetic flux change;
   (c) receiving, amplifying, and filtering said induced voltage signal from said detection coil thereby conditioning said induced voltage signal; and
   (d) analyzing said conditioned induced voltage signal and determining therefrom a quantitative value for said transient torque.

8. The method of claim 7 wherein said step of establishing a baseline magnetic field within said ferromagnetic material of said rotating shaft comprises positioning a permanent DC bias magnet in spaced proximity to said rotating shaft.

9. The method of claim 7 wherein said step of establishing a baseline magnetic field within said ferromagnetic material of said rotating shaft comprises placing a residual magnetic field within said ferromagnetic material of said rotating shaft with a permanent magnet and then removing said permanent magnet from said rotating shaft.

* * * * *